United States Patent [19]

Hussain

[11] 4,041,486
[45] Aug. 9, 1977

[54] PULSE STREAM IDENTIFICATION CIRCUIT

[75] Inventor: Mohammed Imam Hussain, Los Angeles, Calif.

[73] Assignee: RCA Corporation, New York, N.Y.

[21] Appl. No.: 630,730

[22] Filed: Nov. 10, 1975

[51] Int. Cl.² .............................................. G01S 9/02
[52] U.S. Cl. .................................. 343/7.3; 343/18 E; 343/17.1 R; 343/106 R
[58] Field of Search ................. 343/7.3, 17.1 R, 18 E, 343/106 R

[56] References Cited

U.S. PATENT DOCUMENTS

| | | | |
|---|---|---|---|
| 3,889,260 | 6/1975 | Griffin | 343/7.3 |
| 3,976,999 | 8/1976 | Moore et al. | 343/7.3 |

*Primary Examiner*—Maynard R. Wilbur
*Assistant Examiner*—T. M. Blum
*Attorney, Agent, or Firm*—H. Christoffersen; Joseph D. Lazar; Raymond E. Smiley

[57] ABSTRACT

An aircraft DME is receptive of a series of pulses the nature of which alternates between a series of random time spaced pulses and a series of uniform time spaced pulses, where the latter serve to identify the source of the pulses. A set-reset type of counter triggered by the decoded series of random pulses or by the decoded series of uniform time spaced pulses is thereafter continually advanced to a known count producing a gate signal which searches and locks onto the decoded series of uniform time spaced pulses by repeating the process. After a preselected number of repeats corresponding to successive uniformly spaced pulses, audio signals are produced so long as the uniform spaced pulses continue.

6 Claims, 3 Drawing Figures

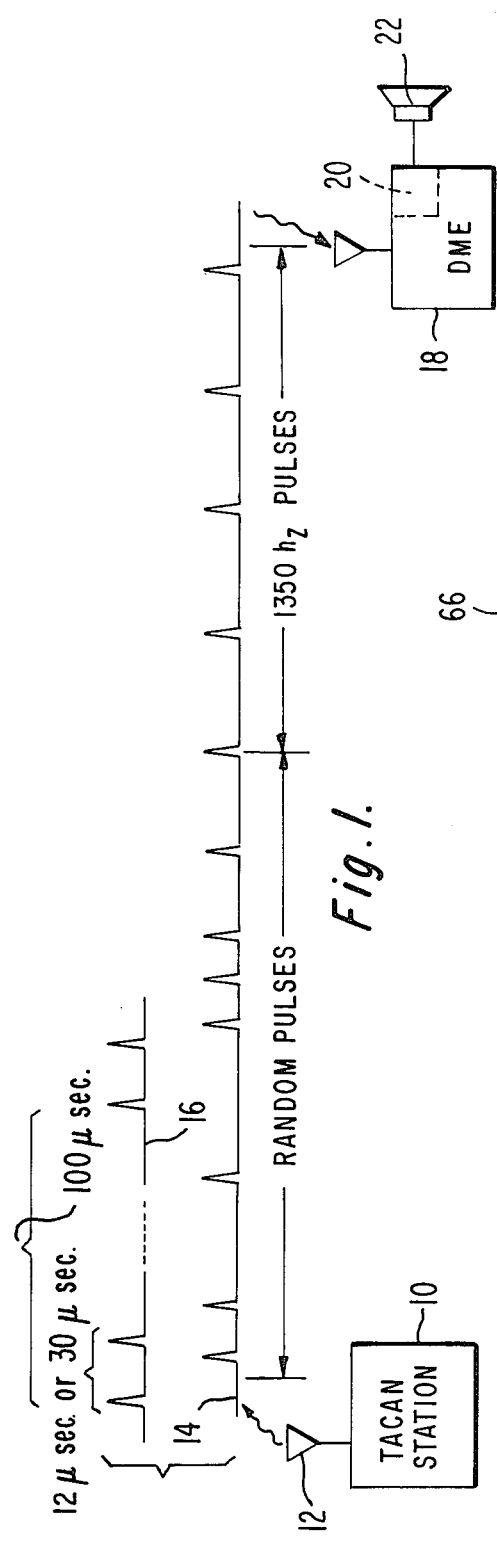
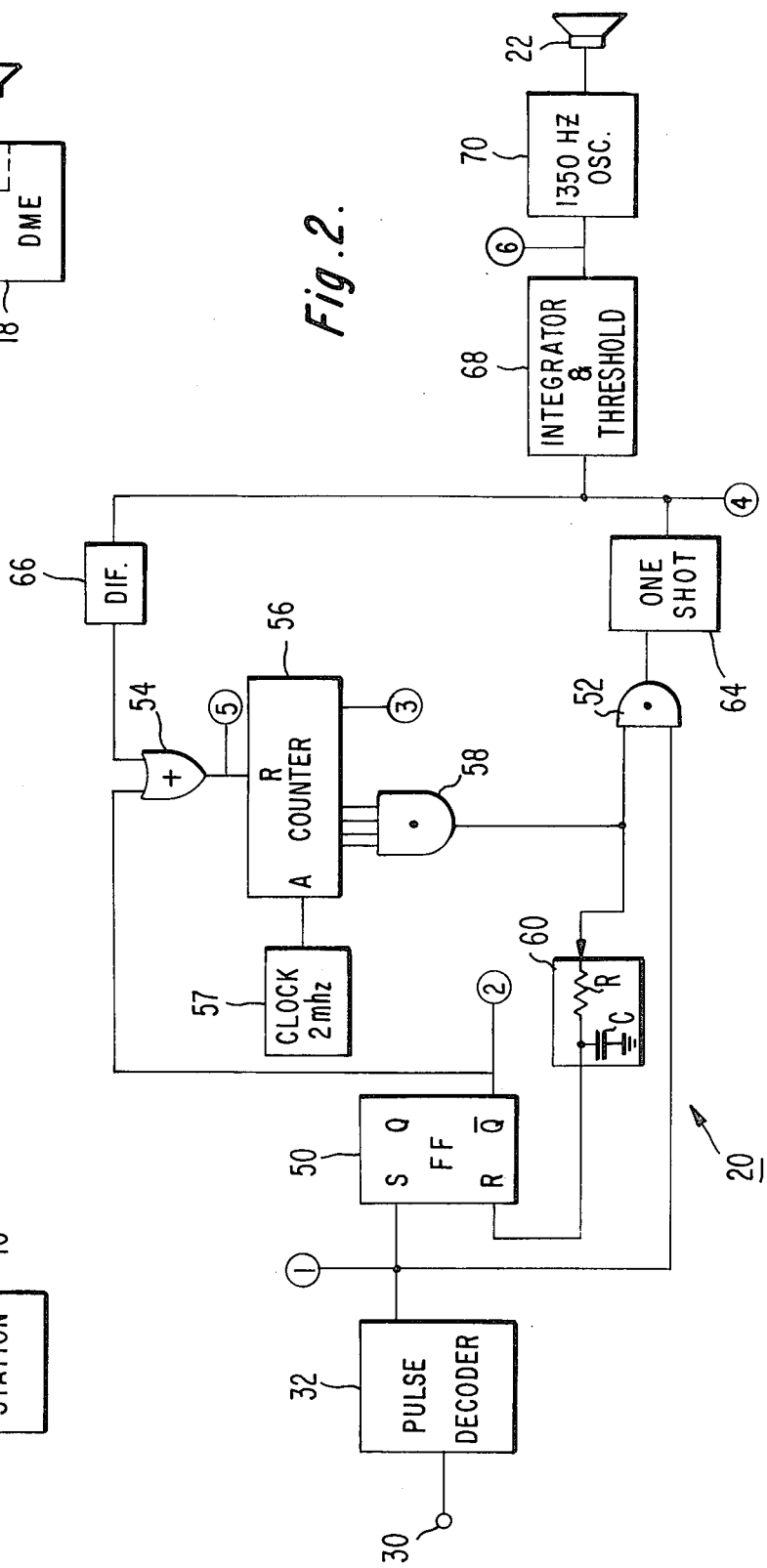

PULSE STREAM IDENTIFICATION CIRCUIT

BACKGROUND OF THE INVENTION

In aircraft DME (Distance Measuring Equipment) randomly spaced pulses received from a Tacan ground station are utilized in a known manner to determine the distance between the aircraft carrying the DME and the ground station. Alternating with the randomly spaced pulses are uniformly spaced pulses at a frequency of 1350 Hz, which result in the creation of an audio signal to provide a Morse code indication distinctly identifying the ground station sending the pulses. Equipment must be provided in the DME for distinguishing between random pulses and uniformly spaced pulses. In prior art equipment, an LC circuit has been provided to act as a bandpass filter ideally passing only pulses at the 1350 Hz uniform spacing, which may be passed directly to an audio circuit or alternatively cause the creation of an audio signal.

In an attempt to minimize the bandwidth of the bandpass filter, an inductor and capacitor with rather close tolerances must be chosen. This necessarily results in a high component cost. Further, regardless of how close the inductor and capacitor integrator values are to design specification, some undesired bandwidth in the passed signal is to be expected, resulting in the passage of undesired signals of a frequency near the desired 1350 Hz. Also, the size of at least the inductor is rather large in comparison to the size of the integrated circuits utilized for other circuit components in the DME. Additionally, extra components are required to drive the LC circuit.

SUMMARY OF THE INVENTION

A system for identifying a stream of uniformly spaced pulses at a time, T, from a stream of randomly spaced pulses, includes timing means responsive to at least each of the pulses following a preceding pulse by time, T, to produce an interrogation pulse at the time of the next expected uniformly spaced pulse. Also included is a means responsive to the concurrent presence of the interrogation pulse and one of the stream of pulses for producing a concurrence signal, and means responsive to the presence of a predetermined number of concurrence signals corresponding to successive uniformly spaced pulses for producing a signal indication that uniformly spaced pulses are present.

BRIEF DESCRIPTION OF THE DRAWING

FIG. 1 depicts a DME system and waveforms useful in understanding the system;

FIG. 2 is a preferred embodiment of a pulse stream identification circuit in block diagram form in accordance with one embodiment of the invention.

DETAILED DESCRIPTION

Figure 3:
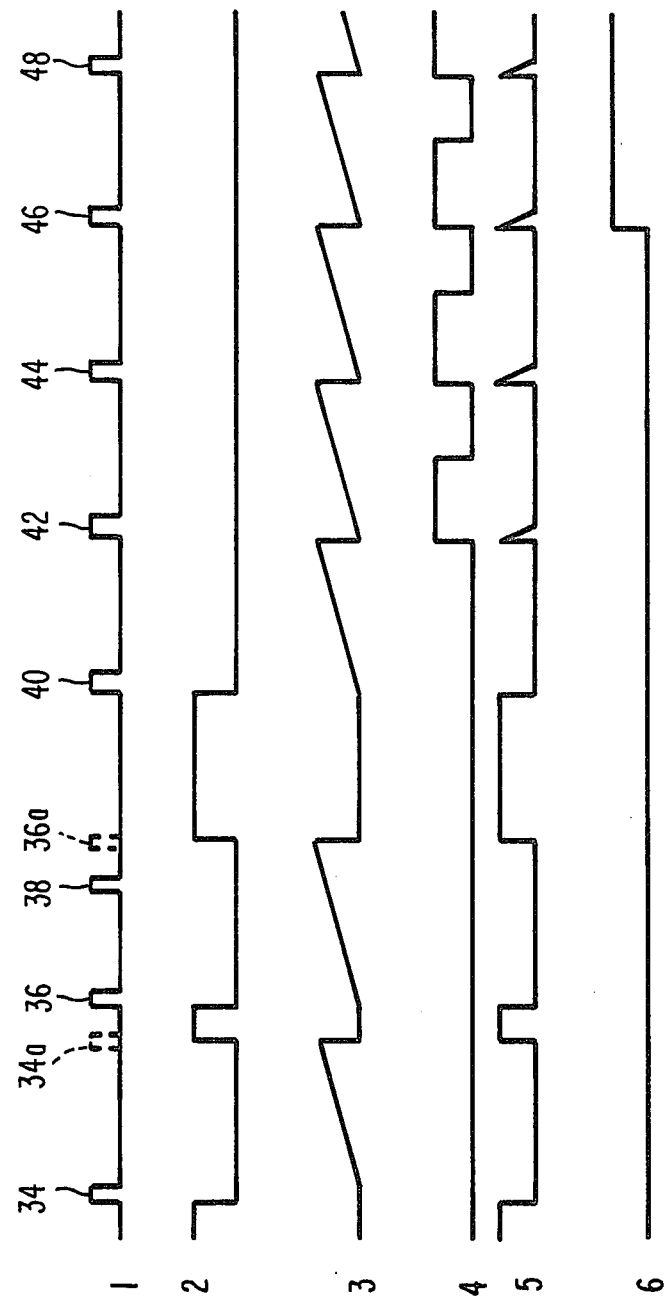
FIG. 3 is a set of waveform useful in understanding the apparatus of FIG. 2.

Referring to FIG. 1, a Tacan ground station 10 is adapted to radiate from its antenna 12 a carrier modulated pulse stream 14 in the form of electromagnetic wave radiation. As known in the prior art, each pulse schematically depicted at 14 in actuality consists of two pairs of pulses as illustrated at 16. As is also known, the pulse stream consists of random pulses useful in determining the distance of an aircraft (not shown) carrying a DME 18 from the ground station 10. The random pulses alternate with uniformly spaced pulses (hereinafter called "USPs") at a 1350 Hz frequency. The duration of the USPs and their juxtaposition with randomly spaced pulses is such as to provide a Morse code identification of the specific ground station 10 transmitting the signal. Thus, for example, a Tacan station having the identifier AHN, where A is represented in Morse code by a dot followed by a dash, would transmit a carrier signal modulated by pulses at the 1350 Hz tone, the duration of which represent a dot, followed by random pulses for the spacing between the dot and dash followed by a 1350 Hz tone, the duration of which represents a dash followed by random pulses for the space between characters. This signal pattern would be followed by the Morse code representation for an H and then for an N.

The waveform 14 is received by all DME receivers such as 18, which are adjusted to receive the carrier frequency transmitted by Tacan station 10. DME receivers 18 are of the type readily obtainable from various avionics manufacturers. One such DME receiver, for example, is the PRIMUS 10 model DME receiver manufactured and sold by the RCA Corporation. DME 18, which demodulates signals it receives producing pulses as at 16, contains a tone identification section 20, illustrated in detail in FIG. 2, to be described shortly, which detects the Morse code identifier from the waveform 14, and causes an equivalent signal to be transmitted aurally to a listener via electronic-to-audio transducer 22.

Referring next to FIG. 2, demodulated pulse stream 14 is applied at terminal 30 to a pulse decoder 32. For each double pair of pulses spaced as shown in waveform 16, decoder 32 produces a momentarily positive going pulse as illustrated in waveform 1, FIG. 3. The encircled numbers at various points in FIG. 2 refer to similarly numbered waveforms in FIG. 3, which represent potential as a function of time. Waveform 1, FIG. 3, represents a signal that might appear at the output terminal of pulse decoder 32. It includes a plurality of pulses 34-40 at a random spacing and a plurality of pulses 40-48 at a uniform spacing. The spacing between some pulses, such as between pulses 34 and 36, may be wider than the spacing between the USPs, the spacing between the pulses 40 and 42 being an example of the latter. The spacing between other pulses, such as between 36 and 38, is shown as being narrower than the spacing between the USPs.

It should be noted that, as illustrated in waveform 1, the width of the pulses as compared to the spacing between pulses is shown greatly exaggerated. Thus, in a practical application, the pulse width may be about 3 microseconds, while the spacing between the USPs is approximately 740 microseconds. The waveforms of FIG. 3 do, however, accurately depict the principles involved.

The output terminal of pulse decoder 32 is coupled to the set (S) terminal of a two-state means such as a flip-flop 50, and to one input terminal of an AND gate 52. The $\overline{Q}$ output terminal of flip-flop 50 is coupled to one input terminal of an OR gate 54. The output terminal of OR gate 54 is coupled to the reset (R) terminal of an incrementing counter 56. A clock source 57 producing uniformly spaced pulses at a rate many times the rate of the USP in waveform 14 (FIG. 1) is coupled to the advance (A) terminal of counter 56. Signals produced in the various counter stages of counter 56, as it counts, are decoded at a decoder such as AND gate 58 to produce a narrow window or gate pulse, the center of which is at a time after the counter has been reset and has begun to count, equivalent to the ideal spacing between the USPs. The output terminal of decoder 58 is coupled to the second input terminal of AND gate 52, and to the input terminal of a delay 60, which may be in the form of an R-C integrator circuit. The output terminal of delay 60 is coupled to the R terminal of flip-flop 50.

Returning to AND gate 52, its output terminal is coupled to the input terminal of a triggerable device such as a one-shot 64. One shot 64, upon receiving a positive going input pulse produces a positive going output pulse for a selected duration such as, for example, about one-half the duration between the USPs. Alternatively, it may be desirable to provide a one-shot, which upon being triggered by a pulse produces an output pulse for a set time which is longer than the time between successive USPs. If the latter type one-shot circuit is chosen, it must be retriggerable. That is, it must retime from each input pulse and must produce at least a momentary pulse suitable to reset counter 56, as the input pulse is received for reasons discussed below. The output terminal of one-shot 64 is coupled to the input terminal of a differentiator 66 and to the input terminal of an integrator and threshold device 68. The output terminal of differentiator 66 is coupled to the second input terminal of OR gate 54.

Upon receipt of a leading edge of a positive going signal at one-shot 64, differentiator 66 produces a momentary spike-like signal to momentarily reset counter 56, which then immediately begins its upward count. Thus, each USP from pulse decoder 32 will, via AND gate 52, one-shot 64, differentiator 66, and OR gate 54, reset or retime counter 56 keeping it in synchronism with the USPs.

Integrator and threshold circuit 68 is responsive to a sufficient duration of positive going output signals from one-shot 64 over a sufficiently short period of time to produce a fixed DC level at its terminal. In practice, it is usually set to produce an output signal when at least three successive USPs are received at terminal 30. The presence of a signal at the output terminal of integrator and threshold circuit 68 triggers an oscillator 70 to produce a tone at speaker 22. Oscillator 70 may produce a 1350 Hz tone to be compatible in sound with older DMEs, in which the signals received by a DME after demodulation are coupled directly to the speaker 22. Alternately, oscillator 70 may be set to produce any audibly appropriate sound.

In operation, it will be assumed that DME 18 is receiving and demodulating first a series of randomly spaced double pairs of pulses, then a series of uniformly spaced double pair of pulses. The convention is hereby established that relatively positive electronic signals will be termed logic 1, while relatively negative signals will be termed logic 0, AND gates and OR gates are enabled by logic 1 signals, and that all other circuit device signals are activated (set, reset, triggered, advanced, etc.) by a logic 1 signal. Finally, it will be assumed that flip-flop 50 is initially reset.

The random pulses and the USPs are received at terminal 30 and decoded by pulse decoder 32 to produce waveform 1, FIG. 3. Pulse 34, waveform 1, FIG. 3, sets flip-flop 50. As a result, the $\bar{Q}$ terminal changes from a logic 1 to a logic 0, releasing the logic 1 reset pulse from counter 56. Therefore, pulses applied to the A terminal of counter 56 by clock 57 advance the counter at a uniform rate which is many times the rate of the USPs. In one working embodiment with USPs, at a 1350 Hz rate, a clock producing a 2 Meg. Hz signal was chosen. The counter advances (illustrated in FIG. 3, waveform 3, as an increasingly positive going waveform, where the base line represents a reset condition) until it reaches a count corresponding to the time at which a USP should follow a preceding USP. At that time, decoder 58 produces a window pulse which primes AND gate 52 and applies a pulse to delay 60, the capacitor of which begins to charge. If USPs were being received (which is not the assumed case), a logic 1 pulse from pulse decoder 32 would enable gate 52. Such a pulse is shown in phantom at 34a in FIG. 3, waveform 1. However, as no pulse is produced at this time by decoder 32 after the delay in delay 60, flip-flop 50 is reset while the output pulse from AND gate 58 is still present. The logic 1 $\bar{Q}$ signal from reset flip-flop 50 is applied via gate 54 to the R terminal of 56, causing the counter to reset.

The following pulse from pulse decoder 32 (i.e. pulse 36) causes the operation just described to be repeated. Pulse 38, which follows pulse 36 by less than the spacing between USPs (were pulse 36 to be followed by a USP, it would appear at the position of phantom pulse 36a) has no effect. It attempts to set flip-flop 50, but the flip-flop is already set.

Pulse 40, assumed to be the first of a series of USPs, has the same effect as pulse 34 and 36, except that concurrently with or shortly after the window logic 1 pulse appears at decoder 58 to prime gate 52, pulse 42 enables gate 52 triggering one-shot 64. The resulting logic 1 signal from one-shot 64 performs two functions. First, it causes a momentary logic 1 pulse to be processed by the differentiator 66 to reset counter 56 to begin again its upward count. Second, the pulse is applied at integrator and threshold circuit 68. The integrator begins integrating as long as the logic 1 from one-shot 64 is present. It should be noted that the pulse from gate 58 will begin to charge the capacitor in delay 60. However, the parameters of the RC time constant are such that before a pulse can be emitted by delay 60 to reset flip-flop 50, register 56 is reset removing the input pulse from delay 60. Thus, as long as USP's are present, flip-flop 50 will not be reset.

Since there is no way of knowing, at this time, whether pulse 42 is a random pulse which just happens to be spaced from pulse 40 the distance of a USP or whether it is the second of a series of USPs, the threshold part circuit 68 is set to require several successive USPs to appear before it produces a pulse. In fact, thereafter when pulses 44 and 46 are present and the window signal is present at decoder 58, the integrator 68 will operate with the threshold circuit to produce a signal triggering oscillator 70. Oscillator 70 continues to provide a signal to produce a tone at speaker 22 so long as USPs are received by DME 18. When thereafter random pulses are again received by DME 18, gate 52 will be blocked and the tone at speaker 22 will cease.

What is claimed is:

1. In a system for identifying a stream of uniformly spaced pulses at a fixed period T from a stream of randomly spaced pulses separated in time from the uniformly spaced pulses, in combination:

means responsive to at least each pulse of said uniformly spaced pulses for producing an interrogation pulse at the fixed time, T, of the next expected uniformly spaced pulse;

means responsive to the concurrent presence of said interrogation pulse and a pulse of said streams of pulses for producing a concurrence signal; and means responsive to the presence of a predetermined number of concurrence signals corresponding to successive uniformly spaced pulses for producing a signal indication that uniformly spaced pulses are present.

2. Apparatus for identifying at first stream of uniformly time spaced pulses at a fixed spacing T from a second stream of randomly time spaced pulses, said first and second streams being separated in time comprising in combination:

two state means responsive to each of said pulses for assuming a first state and responsive to a window signal for assuming a second state;

counter means responsive to said two state means assuming said first state and responsive to a known plurality of successive uniformly spaced clock pulses for producing a window signal indicative of the time, T, when a next succeeding uniformly time spaced pulse is expected;

means responsive to the concurrent presence of said next succeeding uniformly spaced pulse and said window signal for producing a concurrence signal, wherein said counter is also responsive to said concurrence signals and said uniformly spaced pulses for producing said window signal; and means responsive to at least a given number N of said concurrence signals corresponding to N successive uniformly spaced pulses for producing a signal indicating uniformly spaced pulses are being received.

3. Apparatus receptive of electro-magnetic wave energy in the form of a signal stream comprising uniformly spaced pulse sets at period T alternating with a signal stream having randomly spaced pulse sets comprising in combination:

aircraft distance measuring equipment receptive of said wave energy for producing a momentary pulse corresponding to each pulse set;

means responsive to at least each momentary pulse of said uniformly spaced pulses for producing a window pulse at the time T, of the next expected uniformly spaced pulse;

means responsive to the concurrent presence of said window pulse and one of said momentary pulses for producing a concurrence signal; and means responsive to at least a predetermined number of said concurrence signals corresponding to immediately successive uniformly spaced pulses for producing a signal indicating uniformly spaced pulse sets are being received by said distance measuring equipment.

4. The combination of claim 3, wherein said means for producing a window pulse comprises counter means, means for periodically advancing said counter means, and decoder means responsive to said counter means producing a count corresponding in time to the presence of an expected uniformly spaced pulse for producing said window pulse.

5. The combination as set forth in claim 4, wherein there is included a two state means responsive to each momentary pulse for assuming one state and responsive to each window pulse combined with the absence of a concurrence signal for assuming the opposite state, said two state device being coupled to said counter for resetting the same when in said opposite state.

6. The combination as set forth in claim 5, wherein the means producing said concurrence signal is also coupled to said counter for resetting the same.

* * * * *